(12) United States Patent
LaRuffa

(10) Patent No.: US 9,796,297 B2
(45) Date of Patent: Oct. 24, 2017

(54) SYSTEM AND METHOD FOR RECLINING A VEHICLE SEAT

(71) Applicant: Innovative JK Products, LLC, Fullerton, CA (US)

(72) Inventor: Anthony LaRuffa, Fullerton, CA (US)

(73) Assignee: Innovative JK Products, LLC, Fullerton, CA (US)

( * ) Notice: Subject to any disclaimer, the term of this patent is extended or adjusted under 35 U.S.C. 154(b) by 0 days.

(21) Appl. No.: 14/626,488

(22) Filed: Feb. 19, 2015

(65) Prior Publication Data

US 2015/0231995 A1    Aug. 20, 2015

Related U.S. Application Data

(60) Provisional application No. 61/941,711, filed on Feb. 19, 2014.

(51) Int. Cl.
| | |
|---|---|
| *B60N 2/015* | (2006.01) |
| *B60N 2/005* | (2006.01) |
| *B60N 2/30* | (2006.01) |

(52) U.S. Cl.
CPC ............ *B60N 2/015* (2013.01); *B60N 2/005* (2013.01); *B60N 2/30* (2013.01)

(58) Field of Classification Search
CPC ......... B60N 2/005; B60N 2/012; B60N 2/015
USPC .................. 296/64, 65.01, 65.03; 297/463.1
See application file for complete search history.

(56) References Cited

U.S. PATENT DOCUMENTS

| | | | | |
|---|---|---|---|---|
| 4,534,593 | A | * | 8/1985 | Ojala ....................... A47C 7/46 297/284.2 |
| 2005/0035248 | A1 | * | 2/2005 | Cuadra, Jr. ............ B60N 2/015 248/201 |
| 2014/0070067 | A1 | * | 3/2014 | Jonsson ................. B60N 2/015 248/429 |

OTHER PUBLICATIONS

Wrangler Forum; 2011 Detonator Yellow Unlimited forum posts from Nov. 13, 2010; retreived from http://www.wranglerforum.com/f274/2011-detonator-yellow-unlimited-66227-2.html#post875636.*
Wrangler Forum; Back seat mod forum posts; retrieved from http://www.wranglerforum.com/f274/back-seat-mod-247398.html.
JK Forum; Rear Seat Angle Adjustment Write-Up forum posts; retrieved from http://www.jk-forum/forums/jk-write-ups-39/rear-seat-angle-adjustment-write-up-44784/.
JKOwners; Better Angle for Rear Seat Unlimited forum posts; retrieved from http://www.jkowners.com/forum/showthread.php?t=20378.

(Continued)

*Primary Examiner* — Jason S Daniels
(74) *Attorney, Agent, or Firm* — Woods Oviatt Gilman LLP; Katherine H. McGuire, Esq.; Douglas R. Smith, Esq.

(57) ABSTRACT

A system for reclining a vehicle seat is provided. The system comprises a plurality of seat bracket spacers adapted to be secured between a seat mounting bracket and a vehicle floor. A plurality of leg spacers is adapted to be secured between a seat leg and the vehicle floor. The seat bracket spacers create a fixed seat recline while the leg spacers accommodate a gap between respective seat legs and the vehicle floor caused by the fixed seat recline. Each of the seat bracket spacers has a thickness which allows for the maximum amount of seat recline without any modification to factory brackets, legs, or mounting bolts. Additionally, the fixed seat recline does not impact operation of factory safety restrain- (Continued)

ing devices; nor does it impact the ability of the vehicle seat to fold forward.

11 Claims, 3 Drawing Sheets

(56) References Cited

OTHER PUBLICATIONS

Author: J_Westy, Wranglerforum.com—2011 Detonator Yello Unlimited, Initial message and explanation Nov. 13, 2010 with additional comments and designs through this document through priority date of application. pp. 2 Place of publication: Internet, http://www.wranglerforum.com/f274/2011-detonator-yellow-un-limited-66227-2.html#post874071.†
Author: 4×4×4, JKOwners.com—Better Angle for Rear Seat Unlimited, Initial message and explanation Dec. 22, 2009 with additional comments and designs through this document through priority date of application. pp. 2 Place of publication: Internet, http://www.jkowners.com/forum/showthread.php?t=20378.†
Author: Josephus, JK-Forum.com—Rear Seat Angle Adjustment Write-up, Initial message and explanation Jun. 18, 2008 with additional comments and designs through this document through priority date of application. pp. 1-13 Place of publication: Internet, http://www.jk-forum.com/forums/jk-write-ups-39/rear-seat-angle-adjustment-write-up-44784/.†

\* cited by examiner
† cited by third party

SYSTEM AND METHOD FOR RECLINING A VEHICLE SEAT

TECHNICAL FIELD

The present invention is directed to a system and method for reclining a vehicle seat, specifically to a system and method for reclining a vehicle's rear seat, and more specifically to a system and method for reclining the rear seat of a Jeep JK Unlimited vehicle. While many vehicles, such as the Jeep JK Unlimited, have the ability to fold the seatback forward so as to allow for a flat cargo area or to increase the cargo area of the vehicle, they lack the ability to adjust the range of rear seat recline. The present invention utilizes a system and method of seat spacers to increase rider comfort by creating a fixed rear seat recline.

BACKGROUND OF THE INVENTION

Passenger vehicles that offer two of more rows of seating, such as the Jeep JK Unlimited, generally provide second, and possibly third or fourth row seating by way of a seat bench fixedly mounted to the floor of the vehicle. The bench may be directly bolted to the floor or may be mounted onto a bracket which is then secured to the vehicle's body. These "rear seats" are typically bench style seats having a padded seat platform and an angled back rest. In some vehicle models, the angled back rest is pivotally connected to the platform such that the back rest can fold forward to lie on the platform thereby creating a flat cargo area or otherwise increasing the cargo hold volume of the vehicle. One significant drawback of the bench seat is the inability to adjust the seat's angle of recline. That is, the platform and back rest are fixedly secured to the body of the vehicle at a predetermined angle. In some cases, riders occupying the rear seats may not find the predetermined seat angles to be comfortable or to be adequately supporting the rider's back or legs.

Therefore, it is a principal object of the present invention to provide a system and method for adjusting the angle of recline of a vehicle's rear seat.

It is a further object of the present invention to provide a system and method for adjusting the rear seat recline angle without requiring modifications to any of the factory installed brackets, legs or mounting bolts.

It is still a further object of the present invention to provide a system and method for adjusting the recline angle of a rear seat which does not adversely affect the proper functioning of factory installed safety restraining devices.

It is yet a further object of the present invention to provide a system and method for adjusting the rear seat recline angle without impacting the ability of the back rest to pivot over and onto the seat platform.

SUMMARY OF THE INVENTION

In one aspect of the invention, a system is provided for retrofitting a vehicle to adjust the rear seat recline angle relative to the frame of the vehicle. In an embodiment of a system of the present invention, a number of spacers are provided wherein these spacers are sized and proportioned to be inserted between the factory installed seating hardware and the body of the vehicle. The dimensions of these spacers are preferably optimized to have thicknesses which allow for the ability to safely and securely adjust the recline angle to its maximum amount without requiring modification of the factory installed brackets, legs or mounting bolts. The number and dimensions of the spacers are vehicle dependent as the degree of recline and factory installed materials vary from manufacturer to manufacturer, as well as within vehicle models and trim packages of individual car makers.

Accordingly, a system for reclining a vehicle seat is provided which comprises a plurality of seat bracket spacers adapted to be secured between a respective seat mounting bracket and a vehicle floor. A plurality of leg spacers is adapted to be secured between a respective seat leg and the vehicle floor. The seat bracket spacers create a fixed seat recline while the leg spacers accommodate a gap between respective seat legs and the vehicle floor caused by the fixed seat recline. Each of the seat bracket spacers has a thickness which allows for the maximum amount of seat recline without any modification to factory brackets, legs, or mounting bolts. Additionally, the fixed seat recline does not impact operation of factory safety restraining devices; nor does it impact the ability of the vehicle seat to fold forward.

In another aspect of the invention, a method is provided for retrofitting a vehicle to adjust the rear seat recline. In an embodiment of the method of the present invention, a system comprising a number of spacers is provided, wherein the spacers are dimensioned to fit between the seat hardware and the body of the vehicle. The vehicle owner, or another authorized individual, then removes the bolts securing the rear seat to the vehicle. Respective spacers are positioned to overlap each bolt opening such that the rear seat rests upon the spacers, which in turn rest upon the vehicle's body. The bolts are then reinserted and tightened to secure the rear seat to the vehicle at the modified recline angle.

BRIEF DESCRIPTION OF THE DRAWINGS

The present invention will now be described, by way of example, with reference to the accompanying drawings, in which.

DESCRIPTION OF THE PREFERRED EMBODIMENTS

The present invention is directed toward a system and method for fixedly adjusting the recline angle of a vehicle's seats through the provision of a number of spacers adapted to be inserted and secured between the vehicle's seat support brackets/legs and the vehicle body. In preferred embodiments, the spacers are constructed using any suitable materials, including but not necessarily limited exclusively to, a metal such as aluminum, steel or their alloys or composites, or any suitable polymer or composite having adequate strength and structural rigidity, such as but not limited to polyoxymethylene sold under the DuPont trademark Delrin®. Additionally, spacers are preferably designed, fabricated and installed without requiring modifications to, or replacements of, factory installed components such as factory brackets, legs or mounting bolts. As such, each vehicle may require a custom arrangement of a number and size of spacers. By way of example, and by no means limiting the present invention thereto, the following description and referenced drawings are directed to a system and method for fixedly adjusting the rear seat recline of a Jeep JK Unlimited vehicle. It is understood that those skilled in the art would be able to extend the present teachings to any suitable vehicle, including air-, water-, and/or land-based vehicles.

Figure 1:
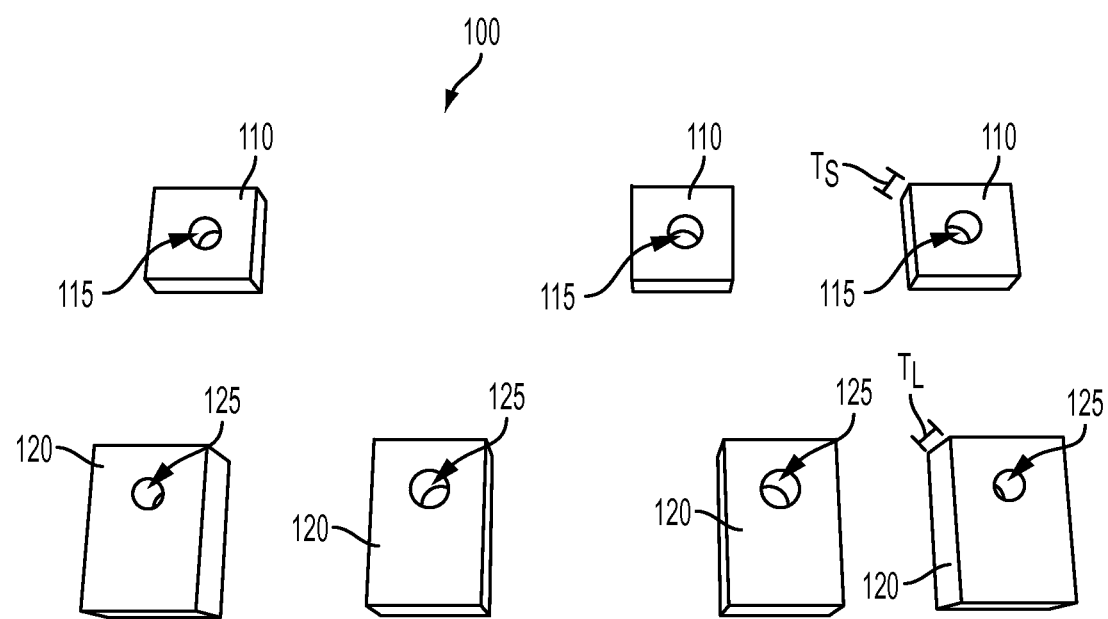
FIG. 1 is a perspective view of an embodiment of a vehicle seat reclining system in accordance with the present invention including a plurality of spacers.

Turning now to FIG. 1, an exemplary embodiment of a system for adjusting the recline of a vehicle seat is generally indicated by reference numeral 100. System 100 has been specifically designed and fabricated for use within the JK chassis platform for vehicle models such as the Jeep JK Unlimited vehicle and includes seven spacers comprised of three seat bracket spacers 110 and four leg spacers 120. Each spacer is proportioned so as to be securely positioned between the frame of the seat and the body of the vehicle. As a result, the insertion of these spacers results in the rear seat rotating rearward, thus creating a fixed recline position which does not affect the ability of the rear seat to fold down.

Figure 2C:
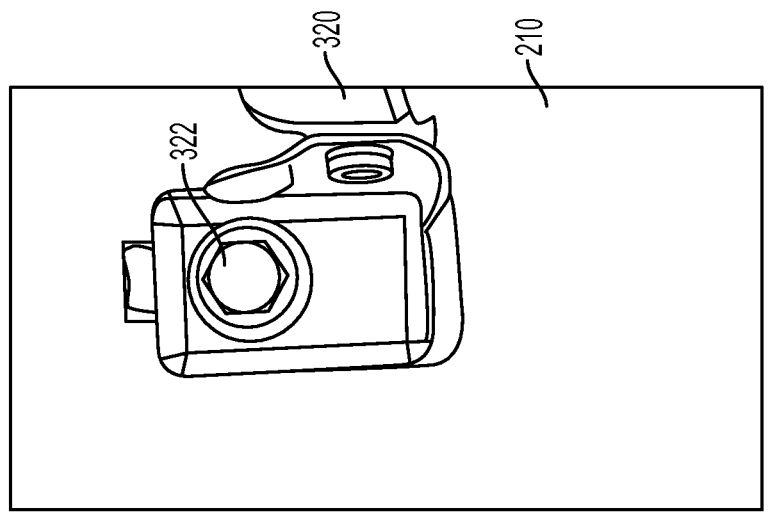
FIG. 2C is an overhead view of the front leg remounted to the vehicle floor and including a spacer envisioned in an embodiment of a vehicle seat reclining system secured between the leg and the floor.
Figure 2B:
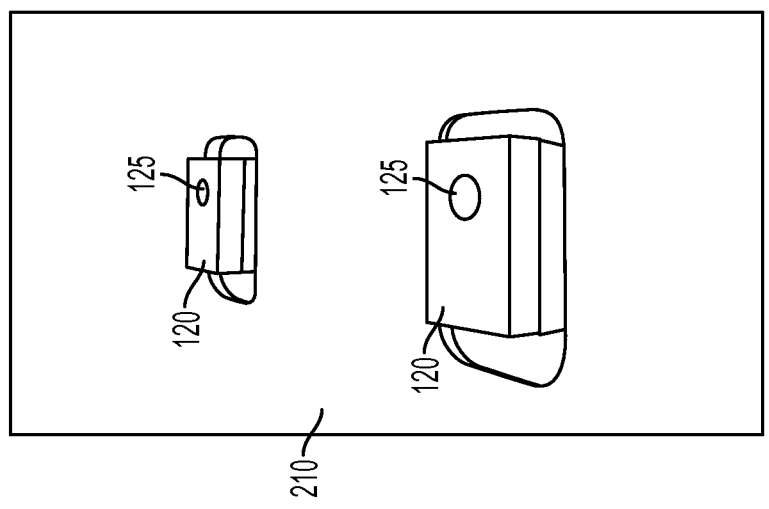
FIG. 2B is a perspective view of a spacer envisioned in an embodiment of a vehicle seat reclining system positioned over the mounting hole used to secure the front legs of the seat to the vehicle floor.
Figure 2A:
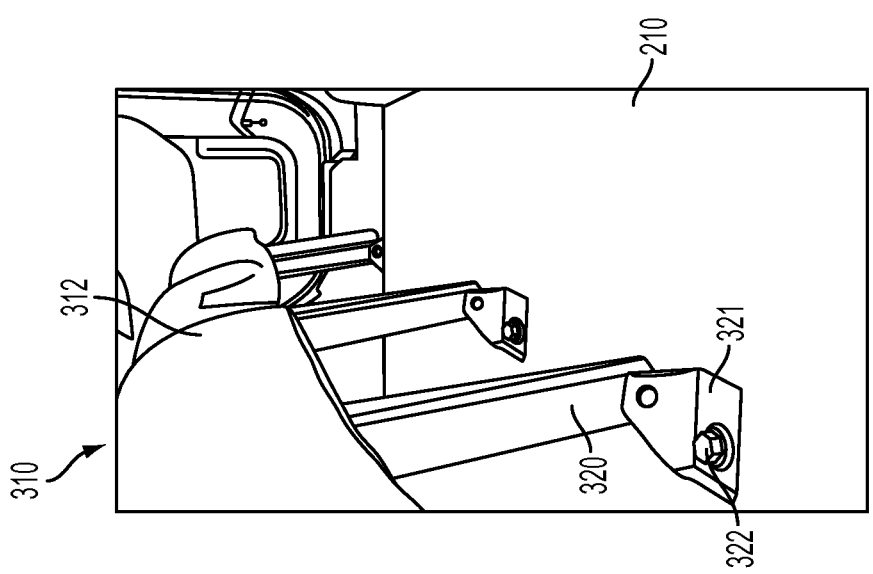
FIG. 2A is a detailed view of a vehicle's front legs supporting a rear seat bench suitable for use with an embodiment of a vehicle seat reclining system in accordance with the present invention.

With reference to FIGS. 2A-2C, each leg spacer 120 is adapted to be secured between the floor 210 and the bottom of a respective one of the four legs 320 that secure the forward portion 312 of the platform 310 of the rear seat (i.e. the end of the platform not pivotally connected to the back rest) to the floor. A hole 125 in each leg spacer 120 allows the factory bolt 322 to pass through the factory plate 321 on the bottom of each leg 320 and then through leg spacer 120 when then leg and spacer are properly oriented in the vehicle. Factory bolt 322 is then threaded into the floor 210 thereby fixedly securing the leg 320 and spacer 120 to the vehicle. In a preferred embodiment of the system 100, leg spacer 120 is machined to have a thickness, $T_L$, of about 1.0 inches (see FIG. 1). Thickness $T_L$ is preferably selected so as to produce a rider-preferred change in the degree of seat recline while also retaining the use of the factory installed bolt 322 without requiring any modifications thereto. It is preferred that upon insertion of the spacer, bolt 322 is threaded in accordance with the manufacturer's recommended specifications (i.e. the bolt is threaded and secured with sufficient torque such as may be measured using a torque wrench). Further, thickness $T_L$ is selected so as not to inhibit or otherwise impede the folding of the rear seat back when hauling cargo.

Figure 3A:
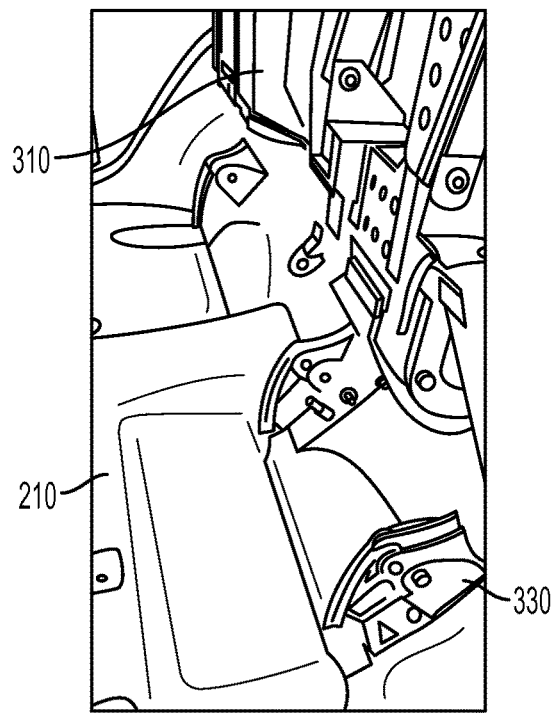
FIG. 3A is a detailed view of the rear mounting bracket for a rear seat bench suitable for use with an embodiment of a vehicle seat reclining system in accordance with the present invention.
Figure 3B:
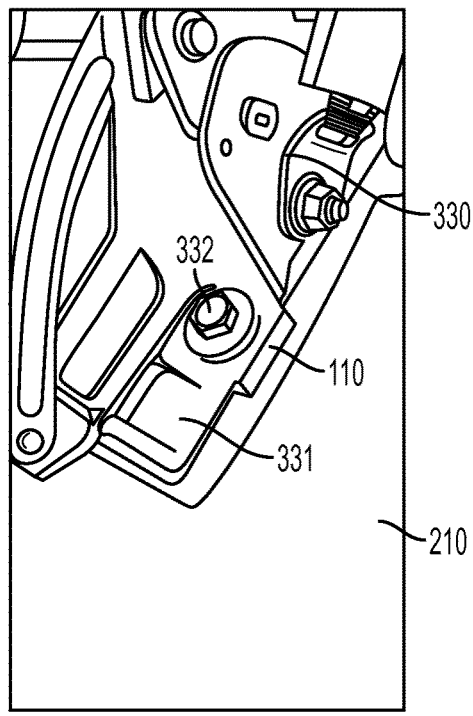
FIG. 3B is a detailed view of the rear mounting bracket shown in FIG. 3A showing the mounting of a spacer envisioned in an embodiment of a vehicle seat reclining system.

Turning now to FIGS. 3A and 3B, in a preferred embodiment of system 100 seat bracket spacers 110 are placed between the floor 210 and a respective rear seat mounting bracket 330 at the forward mounting point 331. A hole 115 in each spacer 110 (see FIG. 1) allows the factory bolt 332 to pass through each rear seat mounting bracket 330 and its respective seat bracket spacer 110. Again, factory bolt 332 is threaded into the floor 210 thereby fixedly securing the rear seat mounting bracket 330 (with attached seat 310) and seat bracket spacer 110 to the vehicle. In a preferred embodiment of the system 100, seat bracket spacer 110 is machined to have a thickness, $T_S$, of from about 0.5 inches to about 1.0 inches (see FIG. 1). Thickness $T_S$ is preferably selected so as to produce a rider-preferred change in the degree of seat recline while also retaining the use of the factory installed bolt 332 without requiring any modifications thereto. Again, the bolt 332 is preferably threaded in accordance with the manufacturer's recommended specifications. Further, thickness $T_S$ is selected so as not to inhibit or otherwise impede the folding of the rear seat back when hauling cargo. In this manner, once all seven spacers 110 and 120 have been secured in place by the factory bolts, the rear seat is in a modified fixed reclined position.

In a further embodiment of the present invention, a method of adjusting the recline angle of a vehicle's seat is provided. In a step of the method, a system of spacers is provided. To install the spacers, the bolts securing the front legs of the vehicle seat which are supporting the seat platform are removed. With the forward end of the platform released from the floor of the vehicle, the platform (with attached legs) is then pivoted and secured so as to lie against the seat back. Pivoting the seat platform exposes the seat mounting brackets and associated mounting bolts. The exposed bench mounting bolts are then removed. While lifting the seat, appropriate spacers are then positioned beneath each of the front legs and each of the seat mounting brackets such that holes within the legs/brackets and spacers align with the hole within the vehicle floor. The factory bolts are then rethreaded within their respective holes thereby securing the seat and spacers to the vehicle.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for reclining a vehicle seat in a vehicle, said vehicle seat having a plurality of seat legs removably mounted to a floor of said vehicle, the system consisting of:
   a) a plurality of unitary seat bracket spacers, each unitary seat bracket spacer adapted to be secured between a respective seat mounting bracket and said vehicle floor, each said unitary seat bracket spacer having a thickness of about 0.5 inches; and
   b) a plurality of unitary leg spacers, each said unitary leg spacer adapted to be secured between a respective seat leg and said vehicle floor, each said unitary leg spacer having a thickness of about 1.0 inches;
   wherein said unitary seat bracket spacers create a fixed seat recline and wherein said unitary leg spacers accommodate a gap between respective seat legs and said vehicle floor caused by said fixed seat recline.

2. The system for reclining a vehicle seat of claim 1, wherein each of the plurality of unitary seat bracket spacers allows the maximum amount of seat recline without any modification to factory brackets, legs, or mounting.

3. The system for reclining a vehicle seat of claim 1, wherein the fixed seat recline does not impact operation of factory safety restraining devices.

4. The system for reclining a vehicle seat of claim 1, wherein the fixed seat recline does not impact an ability of the vehicle seat to fold forward.

5. The system for reclining a vehicle seat of claim 1, wherein each of the plurality of unitary seat bracket spacers and each of the plurality of unitary leg spacers is constructed of a material selected from: aluminum, an aluminum alloy, steel, a steel alloy, a polymer or a composite.

6. The system for reclining a vehicle seat of claim 1, wherein each of the plurality of unitary seat bracket spacers and each of the plurality of unitary leg spacers includes a hole through which a factory bolt may be threaded when each spacer is fixedly secured between its respective bracket or leg and the vehicle floor.

7. A method for reclining a vehicle seat in a vehicle, said vehicle seat having a seat platform and seat back and a plurality of seat legs removably mounted to a floor of the vehicle, the method comprising the steps of:
   a) providing a vehicle seat reclining system, the vehicle seat reclining system consisting of:
      i) a plurality of unitary seat bracket spacers, each unitary seat bracket spacer adapted to be secured between a respective seat mounting bracket and the vehicle floor, each said unitary seat bracket spacer having a thickness of about 0.5 inches; and
      ii) a plurality of unitary leg spacers, each unitary leg spacer adapted to be secured between a respective seat leg and the vehicle floor, each said unitary leg spacer having a thickness of about 1.0 inches;
      wherein each of the plurality of unitary seat bracket spacers and each of the plurality of unitary leg spacers includes a respective hole;
   b) removing respective seat leg bolts which secure the respective seat legs of the vehicle seat to the vehicle floor;
   c) pivoting the seat platform to lie against the seat back;
   d) removing respective bracket mounting bolts which secure the respective seat mounting bracket to the vehicle floor;
   e) lifting the vehicle seat so as to provide sufficient clearance to allow each of the plurality of unitary seat bracket spacers and the plurality of unitary leg spacers to be positioned beneath their respective seat mounting bracket or respective seat leg;
   f) positioning a respective unitary seat bracket spacer and a respective unitary leg spacer beneath their respective seat mounting bracket or respective seat leg such that the hole within the respective spacer overlaps a hole within the bracket or seat leg and the vehicle floor;
   g) positioning each of the seat leg bolts and bracket mounting bolts within a respective overlapped hole such that a spacer is positioned between its respective bracket or leg and the vehicle floor; and
   h) rethreading each of the seat leg bolts and bracket mounting bolts to fixedly secure the vehicle seat to the vehicle floor.

8. The method for reclining a vehicle seat of claim 7, wherein each of the plurality of unitary seat bracket spacers allows the maximum amount of seat recline without any modification to factory brackets, legs, or mounting bolts.

9. The method for reclining a vehicle seat of claim 7, wherein the fixed seat recline does not impact operation of factory safety restraining devices.

10. The method for reclining a vehicle seat of claim 7, wherein the fixed seat recline does not impact an ability of the vehicle seat to fold forward.

11. The method for reclining a vehicle seat of claim 7, wherein each of the plurality of unitary seat bracket spacers and each of the plurality of unitary leg spacers is constructed of a material selected from: aluminum, an aluminum alloy, steel, a steel alloy, a polymer or a composite.

* * * * *